(No Model.) 5 Sheets—Sheet 1.
J. W. WALLIS.
COTTON PICKER.
No. 397,209. Patented Feb. 5, 1889.
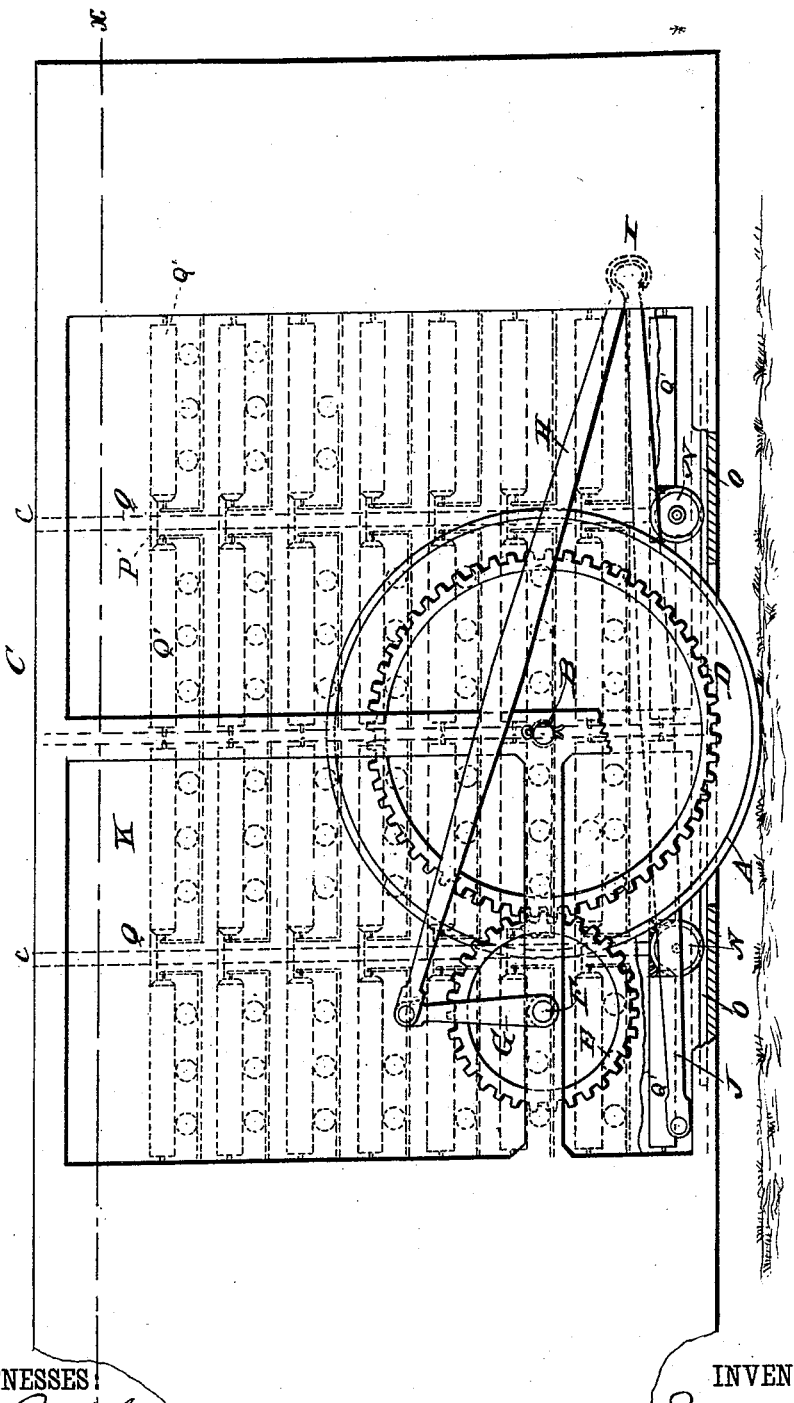
Fig. Z.
WITNESSES
George Binkenburg
C. Sedgwick
INVENTOR:
J. W. Wallis
BY Munn & Co
ATTORNEYS.

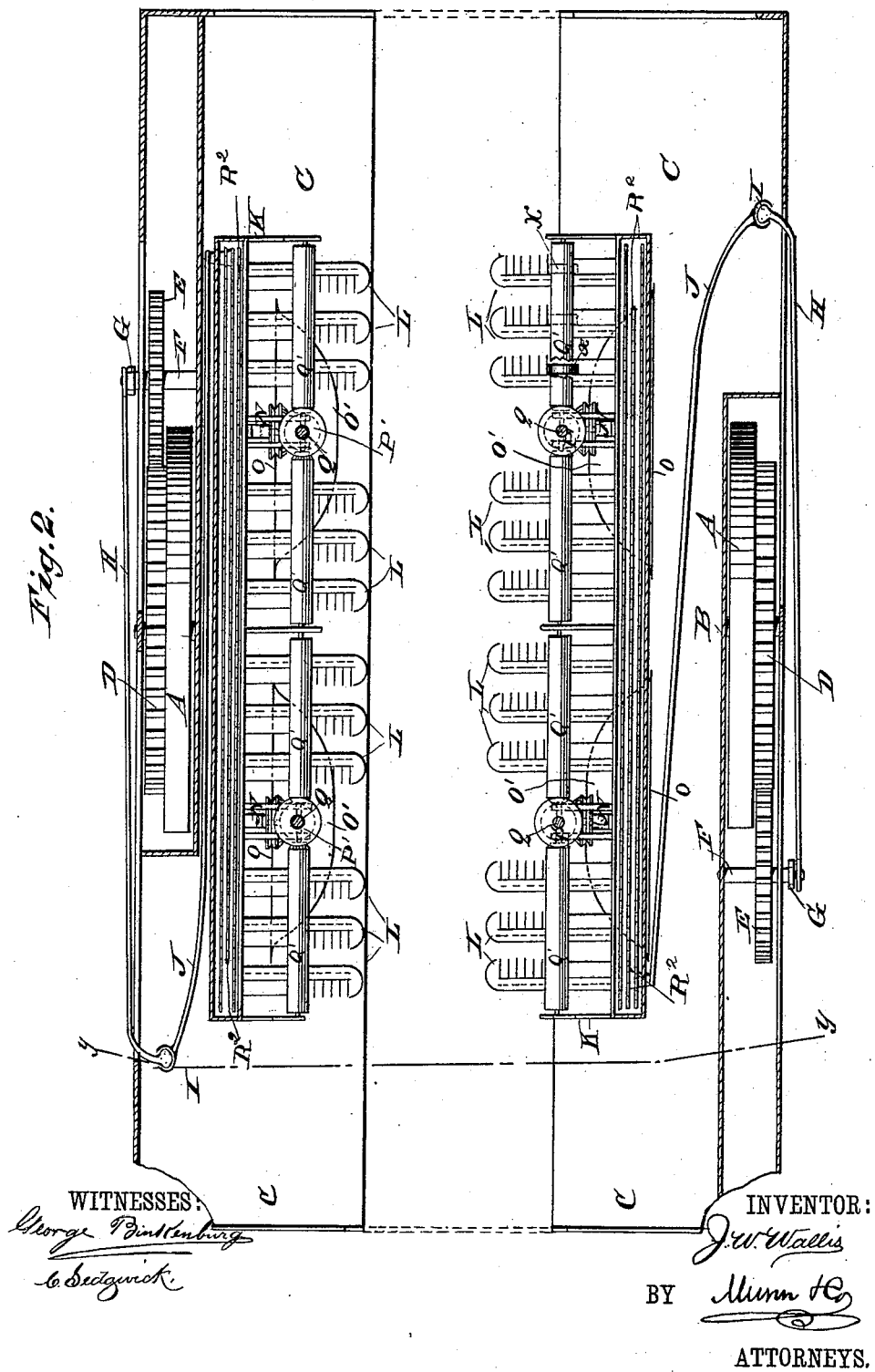

(No Model.) 5 Sheets—Sheet 3.
J. W. WALLIS.
COTTON PICKER.
No. 397,209. Patented Feb. 5, 1889.
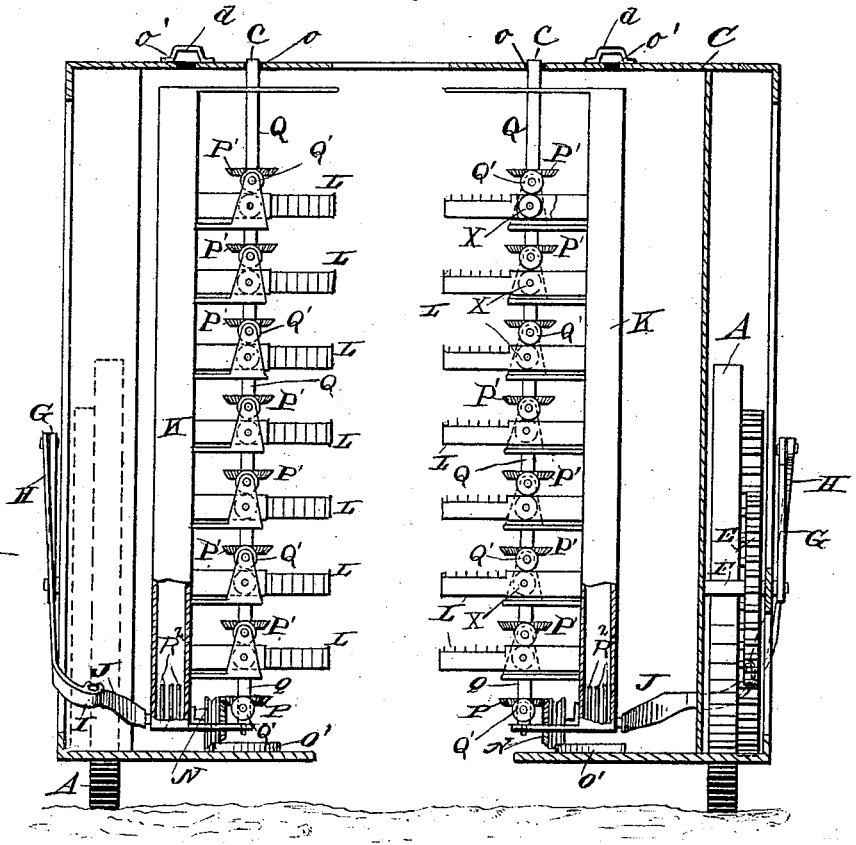
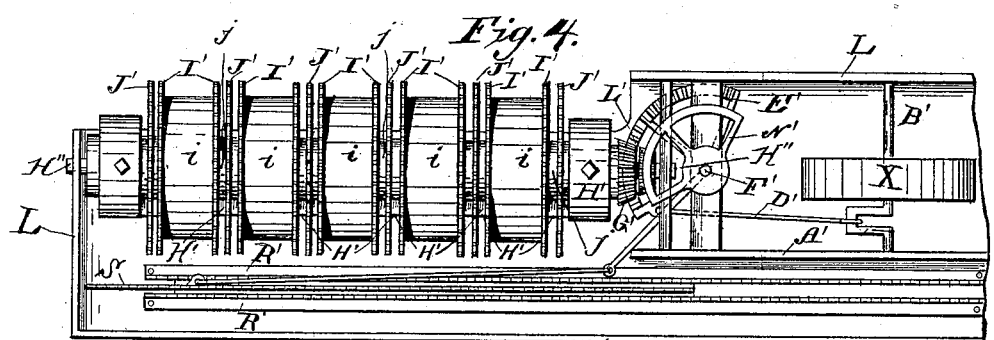
WITNESSES: INVENTOR:

(No Model.) 5 Sheets—Sheet 4.
J. W. WALLIS.
COTTON PICKER.
No. 397,209. Patented Feb. 5, 1889.
Fig. 5.
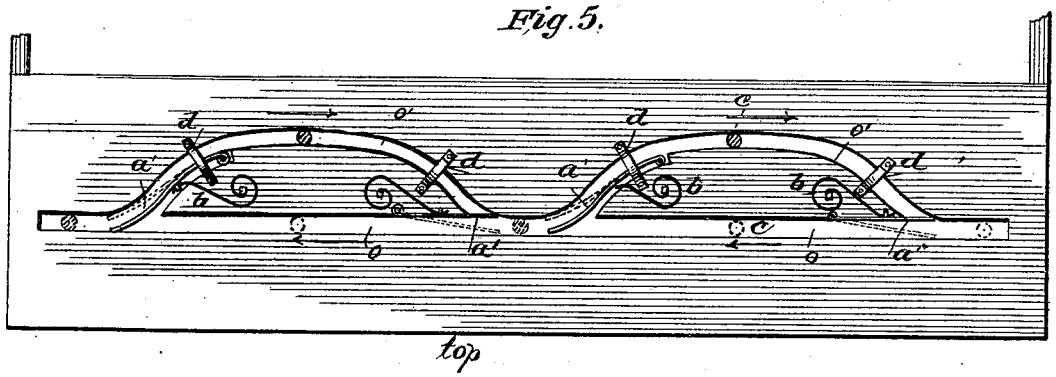
top
Fig. 6.
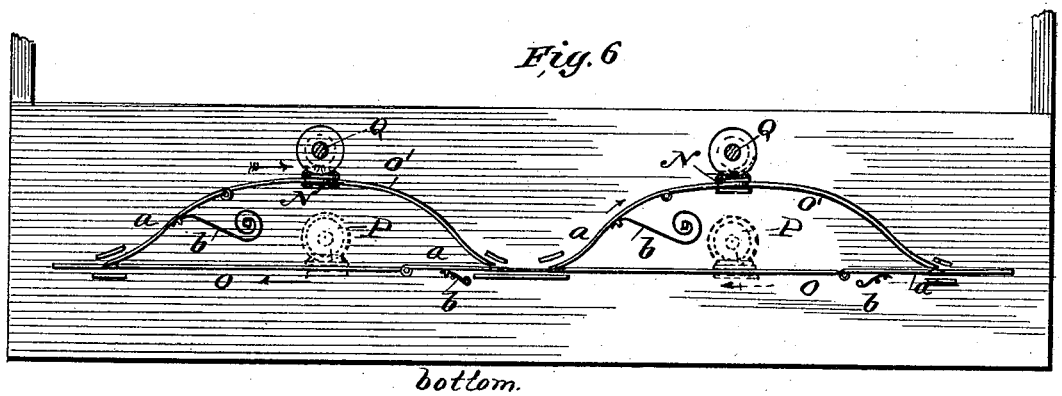
bottom.
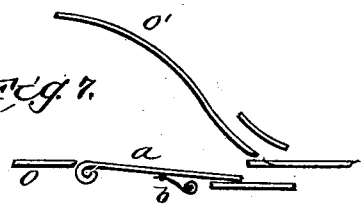
Fig. 7.
Fig. 8.
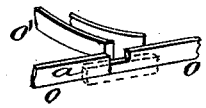
WITNESSES:
C. Sedgwick.
J. M. Ritter.
INVENTOR
J. W. Wallis
BY
Munn & Co.
ATTORNEYS.

(No Model.) 5 Sheets—Sheet 5.

J. W. WALLIS.
COTTON PICKER.

No. 397,209. Patented Feb. 5, 1889.

WITNESSES:
E. M. Clark
J. M. Ritter

INVENTOR
J. W. Wallis
BY
Munn & Co.
ATTORNEYS.

UNITED STATES PATENT OFFICE.

JAMES W. WALLIS, OF BIRMINGHAM, ALABAMA.

COTTON-PICKER.

SPECIFICATION forming part of Letters Patent No. 397,209, dated February 5, 1889.

Application filed September 8, 1887. Serial No. 249,165. (No model.)

*To all whom it may concern:*

Be it known that I, JAMES W. WALLIS, of Birmingham, in the county of Jefferson and State of Alabama, have invented an Improvement in Cotton-Harvesters, of which the following is a specification.

My invention is an improvement in that class of cotton-harvesters in which the pickers or devices for removing the cotton from the bolls have a reciprocating movement, whereby they are caused to swing into and out of the cotton-plants.

The construction and combination of parts embodying the invention are as hereinafter described and claimed. Certain parts are, however, described which are not claimed herein, because they form the subject of an application, Serial No. 241,294, filed by me June 14, 1887.

Figure 9:
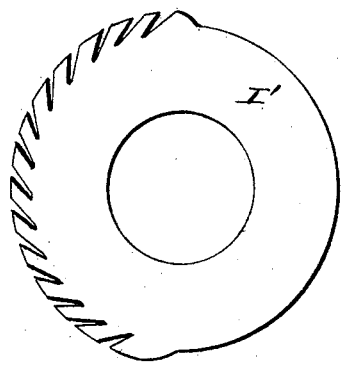
Figure 12:
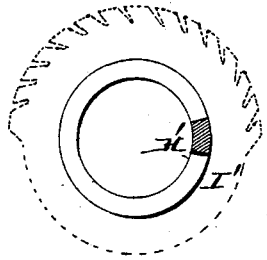
Figure 10:
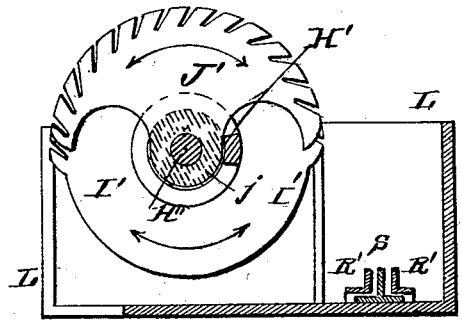
Figure 11:
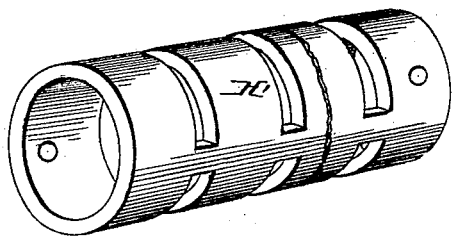

In the accompanying drawings, (five sheets,) Figure 1, Sheet 1, is a side view, with part broken out, of a machine constructed according to my invention. Fig. 2, Sheet 2, is a horizontal section on line $x\,x$, Fig. 1. Fig. 3, Sheet 3, is a vertical cross-section of the same on line $y\,y$, Fig. 2. Fig. 4 is an enlarged plan view of the pickers and mechanism for operating them directly, together with the arm carrying the same. Figs. 5 and 6, Sheet 4, are mainly plan views illustrating the slots, tracks, and switches by which the frames K, carrying the pickers and mechanism for directly operating them, are guided in their movement on the irregular track. Fig. 7 is a plan view, and Fig. 8 a perspective view further illustrating certain portions of the said tracks with their switches, enlarged. Fig. 9, Sheet 5, is a side view of one of the circular toothed plates which perform the picking.
Fig. 10 is a cross-section of one of the arms carrying the pickers. Fig. 11 is a perspective enlarged view of the hollow shaft on which the circular toothed plates are mounted. Fig. 12 is a cross-section of the same, one of the said toothed plates being shown in dotted lines.

As shown in Figs. 1, 2, and 3, the frame of the machine is supported on two large transporting-wheels, A A, whose short axles B have their bearings in the respective sides of frame C. As shown in Figs. 2 and 3, said frame consists of two parallel side portions, which are joined at the top only, there being a central space between the two side portions, which is of sufficient width to allow a row of cotton-plants to pass through it as the machine is drawn along. It will be further seen, by reference to Figs. 2 and 3, that a laterally-movable frame, K, is arranged on each side of the machine, and that each of these frames carries a series of sets of toothed plates which constitute the pickers, the said sets of pickers being arranged horizontally in rows, one above another. The frames K are alternately pushed toward and from the row of cotton-plants, (not shown,) and the pickers remove the cotton from the bolls, which is then transferred back to a suitable receptacle.

I will now describe details.

On each axle B, Figs. 1 and 2, is keyed a large spur gear-wheel, D, which meshes with a smaller one, E, mounted on a transverse shaft, F. The latter rotates in bearings in frame C, and has a crank-arm, G, on its outer end. A long pitman, H, is pivoted to the wrist-pin of this crank-arm, and a long link, J, is connected with the free end of said pitman by a universal joint, I. The free forward ends of these links J are pivoted, respectively, to the movable frames K. (See especially Fig. 2.)

Each frame K is supported by wheels N, which are peripherally grooved and travel in an irregular orbit on tracks O O', which are shown best in Fig. 6, Sheet 4. (See also Figs. 2 and 3.) There are two of these tracks on the floor or base of each side portion of the frame C of the machine. Each track is composed of a straight section, O, and a curved section, O', and each section (see Figs. 6, 7, and 8) has at one end a spring-switch, $a$, which opens to allow the grooved wheels N to pass from one section onto the other. The direction in which the said wheels travel is shown by arrows, Fig. 6, so that they pass from the curved section O' onto the straight section O, and then from the latter back onto the curved section O', and so on continuously so long as the machine is in operation.

The switches or switch-rails $a$ are portions of the tracks of the respective sections O O', and each has a spring, $b$, for holding it normally closed. It will be noted that the straight section O is notched at a point opposite the ends of the curved section O' for wheels N to pass from one section onto the other. As the wheels approach the fixed end of the curved section O', they strike against the side of the adjacent switch $a$ and force it open, as shown in Fig. 7. They then pass onto the notched end of the fixed portion of the straight section O. The switches of course close instantly behind the wheels N, and the latter then pass back and over the same switches along the straight section O, and in so doing strike and open the switch $a$ at the other (left-hand) end of the latter. The wheels N then pass back (to the right) and turn off onto the same switch, and thus begin again the circuit first described.

It is obvious the top portions of frames K must be guided like the lower ones—that is to say, in the same orbit as the wheels N travel. For this purpose the upper ends of shaft Q are extended, Figs. 3 and 5, and form guides $c$, which enter slot $o$ $o'$, having the same form (a straight and a curved section) and inclosing the same space as the tracks O O'. A self-closing spring-switch, $a'$, is placed at the junction of such sections to compel the guides $c$ to follow the irregular path of the slot $o$ $o'$ in the direction indicated by arrows.

In Fig. 3, Sheet 3, the supporting-wheels N of that frame K which appears on the right are on the curved section O' of the track, while the wheels N of the opposite frame K are on the straight section of the other track. The guides $c$ at top of these frames K K of course occupy, respectively, corresponding sections or portions, $o'$ and $o$, of the slots in the top of frame C.

In Figs. 5 and 6, Sheet 4, the wheels N and guides $c$ are shown by full lines in the same position as in the right-hand portion of Fig. 3, and by dotted lines in the position indicated in the left-hand portion of said Fig. 3.

Arched bridge-pieces $d$, Figs. 3 and 5, span the slot $o$ $o'$ and serve to hold in place the segmental-shaped plates surrounded by said slot.

The pickers may be of any approved construction; but I prefer those shown and described in my aforementioned application, Serial No. 241,294, filed June 14, 1887. I illustrate such pickers and direct means for operating them in Fig. 4, also in Sheet 5. L indicates an arm for supporting the same. A series of toothed circular plates, I', are fixed on a hollow shaft, H', and another series of segmental plates, J', on a shaft, H'', which passes axially through the latter. In Figs. 11 and 12 the shaft H' is shown enlarged. In Fig. 4 hollow cylindrical washers $i$ are shown placed between the plates I', and similar but smaller washers $j$ are placed between plates J'. The shafts are oscillated on their axes by means of segmental gears E' N' and bevel-gears G' L', Fig. 4, to which gears oscillating motion is imparted from crank-shaft B' by pitman D', on which a roller or wheel, X, is mounted. (The means for rotating the latter will be presently described.)

The cotton is removed from the plants by the toothed plates I' J', and by them transferred back onto the straight toothed blades R' S. The blades R' are fixed, but blade S is reciprocated by suitable connection with the oscillating shaft F', whereon gears E' N' are mounted, and the blades R' carry the picked cotton along the arm L back into the hollow frame K, in which it falls to the bottom, where, Fig. 2, there are arranged other toothed reciprocating blades, R², for transferring it from frames K to any suitable receptacle that may be provided. The arms L carrying the pickers and transferring devices are arranged in two groups, one opposite the other, Fig. 3, and (as before intimated) placed far enough apart to admit cotton-plants between them. The arms L of each group are arranged one above another in the same vertical plane equidistantly and rigidly attached to the frames K.

I will now describe the means for imparting motion automatically to the picking-plates I' J' through the medium of the rollers X.

The grooved wheels N have bevel gear-teeth on one face, and these mesh with bevel-gears P, mounted on the vertical shafts Q, so that motion is imparted to the latter as the said wheels run over the track O O'. The shafts Q have suitable bearings in frames K, and have a series of gears, P', similar to gears P, which are arranged the same distance apart as the arms L. Each of these gears P' meshes with bevel gear-teeth formed on the contiguous ends of two aligned horizontal cylinders or long rollers, Q', Figs. 2 and 3, and the latter are arranged above and in frictional contact with a series of the rollers X. Thus the rotation of the shaft Q imparts similar motion to the cylinders Q', and thereby to the rollers X which operate the plates I' J'.

The general operation of the machine is as follows: As the machine is drawn along, the transporting-wheels A A travel on opposite sides of a row of cotton-plants, so that the latter occupy the space between the two opposite sets or series of arms L, carrying the plates I' J'. The gear-wheels D rotate with said wheels A, and thus impart rotation to gear-wheels E, Fig. 2, which, by means of crank-arms G and pitman H and link J, impart the before-described movement to the frames K, carrying them successively over the straight and curved sections of the tracks O O'. Thus the frames K carry the picker-arms L alternately into and out of the cotton-plants, and the plates I' J', being simultaneously operated by rollers X, cylinders Q', gears P P', shafts Q, and grooved-wheels N, as before described, the cotton is extracted from the bolls and carried back by toothed blades S R' into the hollow frames K.

It will be noticed that the frames K have opposite movements, one advancing toward and carrying the pickers into the plants as the opposite frame recedes.

What I claim is—

1. In a cotton-harvester, the combination, with the frames carrying the pickers, of wheels on which said frames are supported, and a track for said wheels, which is composed of a straight section and a curved section placed opposite each other and meeting at their corresponding ends, substantially as shown and described, whereby the reciprocating frames make the circuit of the track and thus have a laterally and longitudinally swinging motion, as specified.

2. In a cotton-harvester, the combination, with the main driving-wheels, of frames carrying the pickers, and devices connecting said wheels and frames for reciprocating the latter, wheels for supporting said frames, a track on which these wheels run, vertical shafts mounted in the frames and having gears fixed thereon, means for rotating said shafts, pickers carried by the frames, and means for imparting motion to the pickers from the gears on the said shaft, as shown and described.

3. In a cotton-harvester, the combination, with frames carrying sets of pickers, of wheels on which said frames travel, a track for these wheels which describes an irregular orbit, the section O' of the track nearest the center of the machine being convex toward the center of the machine and the opposite section O straight, as shown and described, whereby the picking-frames have a laterally-swinging and also longitudinal movement, as and for the purpose specified.

4. In a cotton-harvester, the combination, with frames carrying the pickers, and means connected with the driving-wheels for reciprocating the frames, of grooved wheels on which these latter travel, tracks on which the grooved wheels run, vertical shafts which derive motion from said grooved wheels, rollers arranged horizontally and deriving motion from said vertical shafts, and pickers supported on the picking-frames and operated by said rollers, substantially as shown and described.

5. In a cotton-harvester, the combination, with a frame, C, and the main driving-wheels, of a gear-wheel secured to each of the latter, a second gear-wheel, E, meshing with the first, and a crank-shaft whereon it is mounted, reciprocating frames K, carrying the pickers, tracks composed of sections arranged opposite each other and meeting at their corresponding ends, whereon said frames travel, and the pitman H and link J, jointed together and loosely connected with the crank-shaft and reciprocating frames, for imparting motion to the latter, as shown and described.

6. In a cotton-harvester, the combination, with the main driving-wheels and frame C, supported by the same, of a gear-wheel secured to each of said driving-wheels, a second gear-wheel meshing into the first and secured to a shaft mounted in said main frame, a crank-arm secured to the said shaft, a pitman pivotally connected with said crank-arm, a link which is connected to the pitman by a universal joint, frames carrying the pickers connected with the link, wheels supporting said frames, and tracks on which said wheels travel in an irregular orbit, the said tracks being composed of straight and curved sections placed opposite each other and meeting at their corresponding ends, as shown and described.

JAMES W. WALLIS.

Witnesses:
H. C. SELHEIMER,
E. K. FULTON.